(No Model.) 3 Sheets—Sheet 1.

B. F. DUNN & J. C. BRONAUGH.
THEATRICAL STRUCTURE.

No. 573,141. Patented Dec. 15, 1896.

Witnesses:
F. G. Fischer

Inventors:
B. F. Dunn
and J. C. Bronaugh
By Higdon & Higdon
Attys.

(No Model.) 3 Sheets—Sheet 2.

B. F. DUNN & J. C. BRONAUGH.
THEATRICAL STRUCTURE.

No. 573,141. Patented Dec. 15, 1896.

Witnesses:

Inventors:
B. F. Dunn
and J. C. Bronaugh
By
Attys.

(No Model.) 3 Sheets—Sheet 3.

B. F. DUNN & J. C. BRONAUGH.
THEATRICAL STRUCTURE.

No. 573,141. Patented Dec. 15, 1896.

WITNESSES:

INVENTORS:
B. F. Dunn
and J. C. Bronaugh
BY Higdon & Higdon
ATTYS.

UNITED STATES PATENT OFFICE.

BENJAMIN F. DUNN AND JOHN C. BRONAUGH, OF KANSAS CITY, MISSOURI.

THEATRICAL STRUCTURE.

SPECIFICATION forming part of Letters Patent No. 573,141, dated December 15, 1896.

Application filed February 17, 1896. Serial No. 579,618. (No model.)

*To all whom it may concern:*

Be it known that we, BENJAMIN F. DUNN and JOHN C. BRONAUGH, of Kansas City, Jackson county, Missouri, have invented certain new and useful Improvements in Theatrical Structures, of which the following is a full, clear, and exact description, reference being had to the accompanying drawings, forming a part thereof.

Our invention relates to theater structures and appliances; and it consists in the novel and peculiar features of construction and arrangement hereinafter described and claimed.

The object of our invention is to produce a theater structure with its interior in the form of a circle or segment thereof, and painted in imitation of nature's scenery, in order that the effect of stage-settings of a rural character may be made to appear more natural by reason of such surroundings than if outlined by an architectural configuration. For instance, in an ordinary theater, when a forest scene or other rural scene, such as a house and barnyard, &c., or, in fact, any kind of house, is shown in full, the naturalness of the scenery is destroyed or injured because framed, as it were, by a modern or other architectural outline, while in our structure the natural scenery, such as trees, farm-roads, culverts, &c., as shown, produce a continuity of effect, and the incongruity of architectural moldings surrounding the forest scene is not apparent.

Other objects of the invention will hereinafter appear, and will also be pointed out in appended claims.

Figure 1:
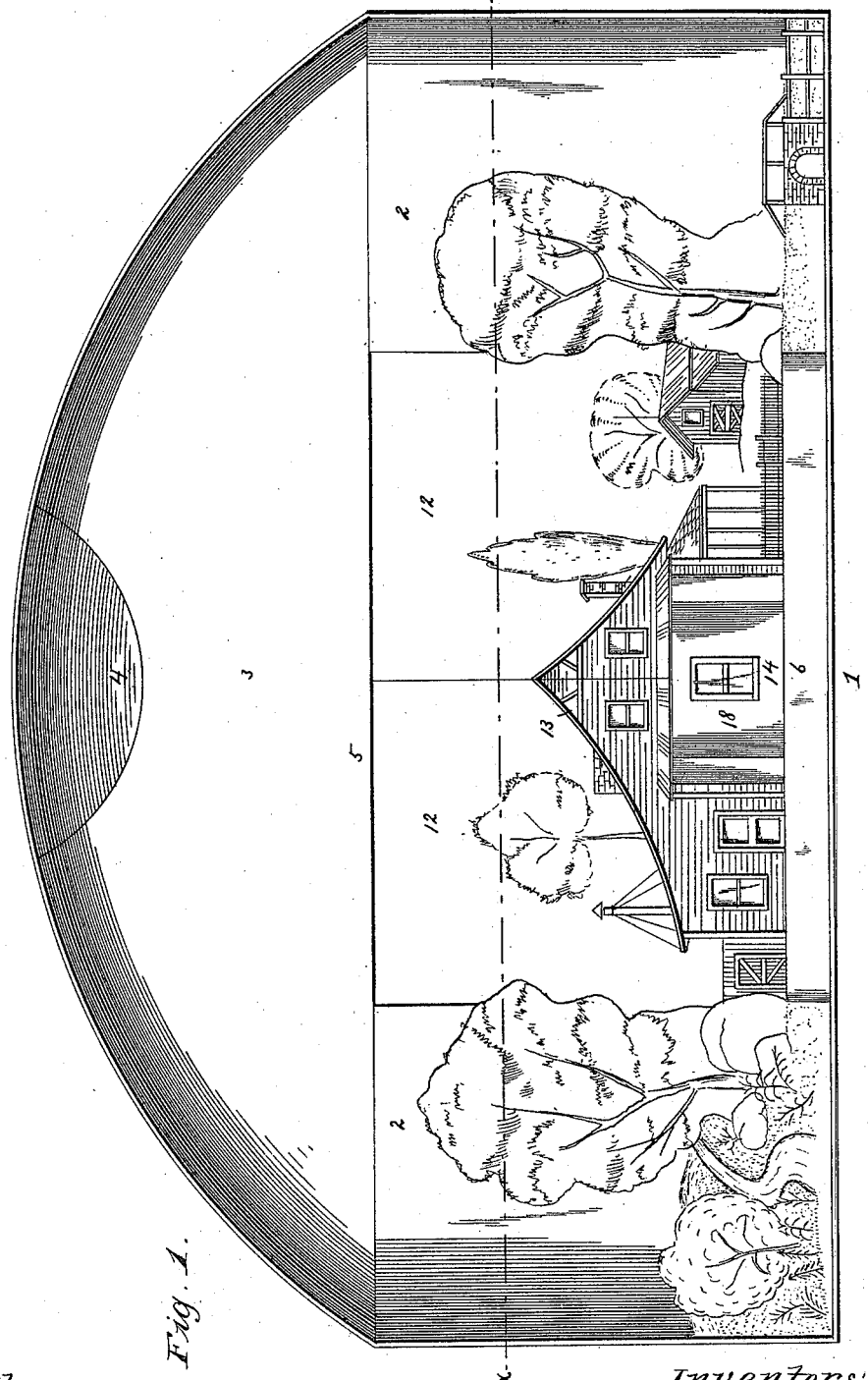
Figure 2:
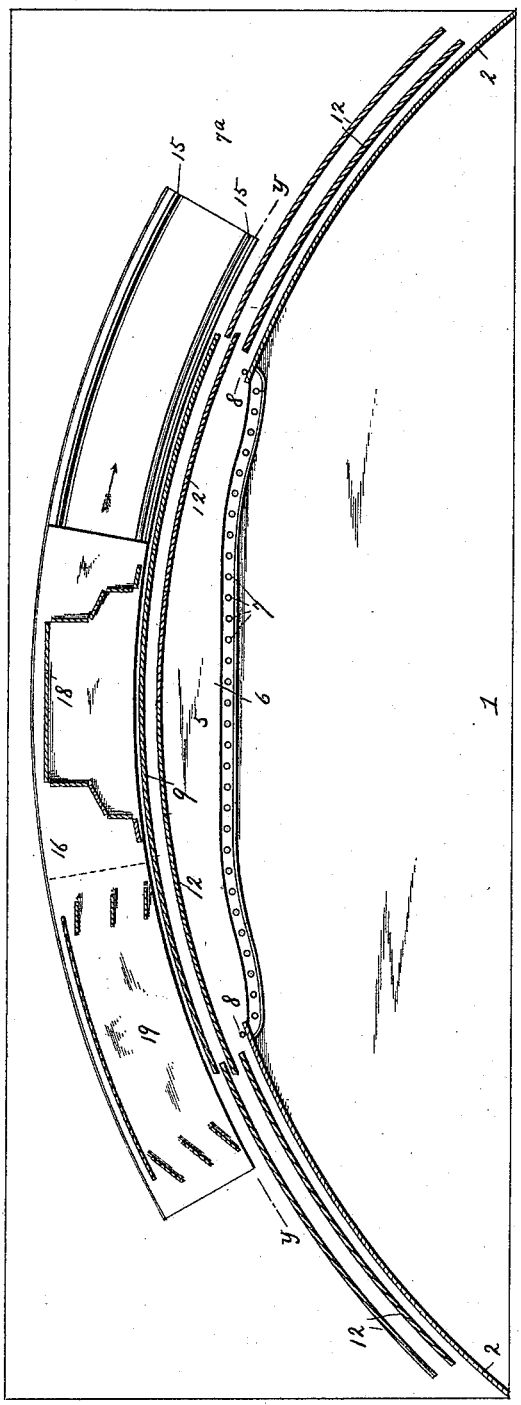
Figure 3:
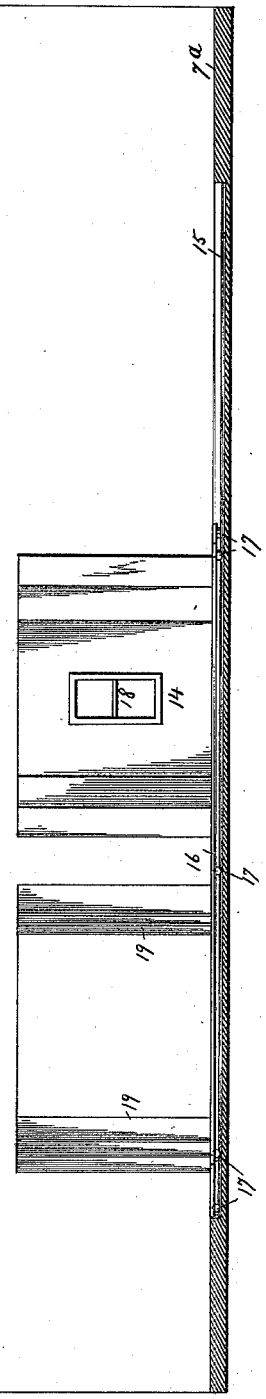
Figure 5:
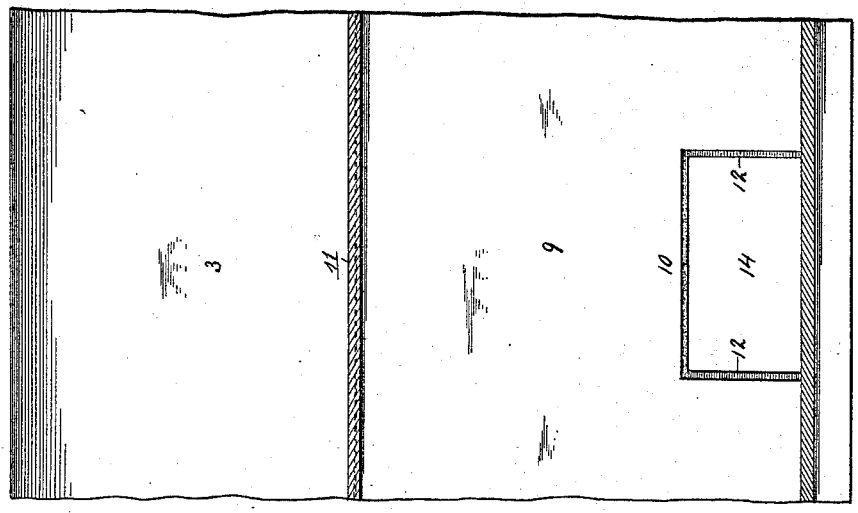
Figure 4:
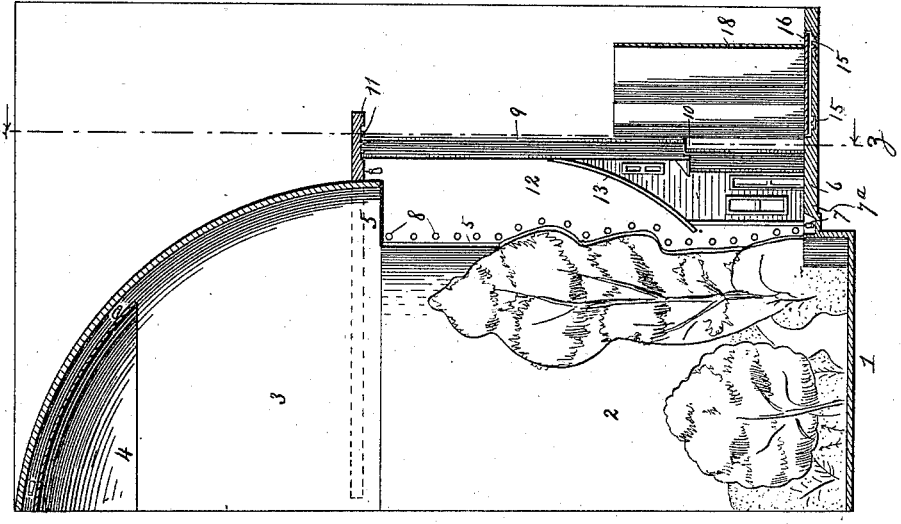

Referring to the drawings, which accompany and illustrate the invention, Figure 1 represents one-half of a theater structure constructed in accordance with our invention and discloses the proscenium-opening and certain movable house-wings in rear thereof. Fig. 2 represents a horizontal section of the same, taken on the line *x x* of Fig. 1. Fig. 3 represents a sectional view taken on the line *y y* of Fig. 2. Fig. 4 is a central section taken at right angles to the plane of the section shown at Fig. 2. Fig. 5 is a vertical section taken on the line *z z* of Fig. 4.

In the said drawings, 1 designates the floor of a theater structure, and 2 the interior curved wall thereof, which is surmounted by an arched ceiling 3, and arranged centrally of and a slight distance below the latter is a curved piece 4, which acts as a screen for the electric lights which will be placed between the same and the ceiling. By this arrangement the light is diffused softly throughout the room, and the incongruity of a forest lighted by electricity is not made prominent. The wall 2, which is painted in imitation of nature's scenery, as hereinbefore referred to, is provided with a large opening 5, which corresponds in width to the front edge of a very wide stage 6, and the latter is provided in the customary manner with a line of footlights 7. Another line of lights may be arranged to the rear and near the vertical edges of the opening, as shown at 8, if desired. Arranged rearward of the wall 2 a suitable distance, and extending centrally therewith, is a stationary set piece 9, which is of greater length than the width of the opening 5, so that its ends overlap the ends of the wall 2, as shown in Fig. 2. This set piece is provided centrally with an opening 10, in size nearly equal, preferably, to the size of an ordinary stage, so that one or more rooms of the ordinary size in the same house may be exposed to view therethrough at the same time, as hereinafter more particularly referred to. This set piece is also painted in imitation of nature's scenery, and with a dense growth of underbrush preferably, so as to deceive the eye of the audience as much as possible by preventing a further view through the woods than the plane of the set piece, except at the point of the opening 10.

12 designates a number of what we term "movable house-wings," also of segmental form and interposed between the wall 2 and the stationary set piece 9. Said house-wings are movable, so as to expose practically the entire set piece when a forest scene is needed, and when a farm-house, a city residence, or other style of building is needed the proper house-wings, one from each side, are slid or moved inwardly until they come together at the middle of the stage and form the picture of a complete house 13, for instance, as illustrated in Fig. 1, and said house-wings 12 are provided with registering notches at their lower inner corners to provide a single opening 14, through which the interior of that particular house may be seen.

Arranged rearward of the set piece, and of greater length than the same, are the parallel and concentrically-extending track-rails 15, which are set, preferably, in a recess in the floor of the stage, and surmounting the same is a movable platform or section of the stage 16, said section being more than double the length of the opening 10 of the set piece 9. Said platform or movable stage-section is mounted upon wheels or rollers 17, which engage the track-rails 15 in order that the stage-section may be moved easily and quickly and with the least possible noise when desired. Upon this stage is built when the house-wings are in position, as shown in Figs. 1 and 4, the interior setting or view 18 of the house, as shown at Fig. 2, and this is opposite to or in rear of the registering openings 14 and 10 of said house-wings and said set piece, respectively, or it may be divided up to represent a number of rooms which are exposed to the view of the audience simultaneously. While the acting is in progress in which this stage scene 18 is used the stage-setting necessary for the next act may be built upon the other end of the stage, as at 19, out of view of the audience, so that after an act is completed the stage-section 16 may be moved in the direction indicated by the arrow, Fig. 2, to cause the stage-setting 19 to appear through said registering openings with the loss of but a few seconds. While this second act is in progress the stage-setting 18 may be replaced by another in the same manner, so that there need be no unnecessary delay between any of the acts.

Thus it will be seen that we have produced a theater structure embodying the advantages pointed out in the statement of invention, and which will obviously facilitate the progress of plays represented therein, besides increasing the naturalness of the effect produced by reason of appropriate surroundings.

It is to be understood, of course, that this structure may be completely circular in form, that is, at least the interior of the auditorium. It is not shown completely circular in the drawings hereto attached, because of the want of space and because it is not deemed necessary to illustrate such obvious construction.

Having thus described our invention, what we claim as new, and desire to secure by Letters Patent, is—

1. A theater structure, having the auditorium inclosure or wall curved in form, and provided with a comparatively large opening at the front of the stage, and also painted in imitation of nature's scenery, movable house-wings, arranged in rear of said wall and provided with notches adapted to register and form openings, and an interior scene arranged in the rear of all said openings formed by said notches, substantially as described.

2. A theater structure, having the auditorium inclosure or wall curved in form, and provided with a comparatively large opening at the front end of the stage, and also painted in imitation of nature's scenery, movable house-wings, arranged in rear of said wall at both sides of said opening and adapted conjointly when moved together to form houses of various styles, and provided at their lower inner corners with registering notches to form a single opening, and a movable platform in the rear, upon which different interior settings may be built, so that by moving said platform different interior views of the same house or of other houses may be disclosed through said house-opening substantially as described.

3. A theater structure, having the auditorium inclosure or wall curved in form, and provided with a comparatively large opening at the front of the stage, and also painted in imitation of nature's scenery, a curved set piece arranged in rear of the auditorium inclosure or wall and bridging its opening, and painted to represent natural scenery, and provided with an opening, and a movable platform in the rear upon which different interior settings may be built, so that by moving said platform different interior views may be disclosed through the opening of said naturally-painted set piece, substantially as described.

In testimony whereof we affix our signatures in presence of two witnesses.

BENJAMIN F. DUNN.
    JOHN C. BRONAUGH.

Witnesses:
 M. R. REMLEY,
 G. Y. THORPE.